(12) United States Patent
Naito (10) Patent No.: US 8,218,055 B2
(45) Date of Patent: Jul. 10, 2012

(54) IMAGING APPARATUS

(75) Inventor: Takuro Naito, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 286 days.

(21) Appl. No.: 12/790,289

(22) Filed: May 28, 2010

(65) Prior Publication Data

US 2010/0302410 A1    Dec. 2, 2010

(30) Foreign Application Priority Data

Jun. 1, 2009    (JP) ................. 2009-132392

(51) Int. Cl.
    *H04N 5/228*      (2006.01)
    *H04N 5/76*       (2006.01)
    *H04N 5/222*      (2006.01)

(52) U.S. Cl. ......... 348/333.04; 348/208.16; 348/333.12; 348/231.3

(58) Field of Classification Search ............. 348/208.16, 348/208.12, 333.02, 231.3, 221.1, 333.04, 348/208.15, 208.99
See application file for complete search history.

(56) References Cited

U.S. PATENT DOCUMENTS

| | | | | |
|---|---|---|---|---|
| 2009/0160949 A1* | 6/2009 | Matsuzaki et al. | ......... | 348/208.4 |
| 2009/0167879 A1* | 7/2009 | Ohno | ............ | 348/208.12 |
| 2009/0174783 A1* | 7/2009 | Nomura et al. | ............ | 348/208.2 |
| 2010/0253792 A1* | 10/2010 | Kawaguchi et al. | ....... | 348/208.2 |
| 2011/0298937 A1* | 12/2011 | Ogawa et al. | ............. | 348/208.4 |

FOREIGN PATENT DOCUMENTS

| | | |
|---|---|---|
| JP | 3399454 B2 | 2/2003 |
| JP | 2004-77713 A | 3/2004 |
| JP | 2005-117395 A | 4/2005 |

\* cited by examiner

*Primary Examiner* — Tuan Ho
*Assistant Examiner* — Shahbaz Nazrul
(74) *Attorney, Agent, or Firm* — Dickstein Shapiro LLP (57) ABSTRACT

An imaging apparatus having a shooting optical system and an image sensor includes an image data producer producing image data; an imaging controller repeatedly outputting one picture unit of image data produced in a predetermined shooting time duration by the image data producer; an image data recorder recording the outputted image data; a position detector detecting a change in position of the imaging apparatus and calculating an amount of displacement of the imaging apparatus from a position at a time point of the imaging apparatus taken as a reference based on the detected change in position; a position recorder recording the amount of displacement and time data related to the amount of displacement; a display section displaying a relationship between a shooting time of each image data of the image data recorder and the amount of displacement recorded by the position recorder, during exposure or at the end of exposure; and an adding processor adding arbitrary image data of the image data recorder and producing an image.

16 Claims, 8 Drawing Sheets

EXPOSURE IN PROGRESS... 8 SECONDS ELAPSES

IMAGING APPARATUS

CROSS REFERENCE TO RELATED APPLICATIONS

The present application is based on and claims priority from Japanese patent application number 2009-132392, filed Jun. 1, 2009, the disclosure of which is hereby reference incorporated by in its entirety.

BACKGROUND

The present invention relates to an imaging apparatus, which is capable of playing back a shot image as an electronic image in real time, and recording the electronic image, and playing back the recorded electronic image, and which is applicable to a digital camera, a mobile phone with a digital camera, a video camera and the like.

In recent years, a shooting technology of an electronic image used for a digital camera and the like has been more widely used along with technical progress, and thereby a shooting is possible under a shooting condition where the shooting is conventionally impossible. As an example, there is a digital camera which is capable of performing a long exposure to shoot a low-brightness photographic subject such as a night sky at high picture quality. However, to shoot a high picture quality image using the long exposure without camera shake, it is necessary to reliably stabilize a digital camera by use of a tripod or the like for a long time in many cases. Accordingly, in a case where a position of the stabilized digital camera is moved during the long exposure for some reason, the shooting may not be satisfactory. Moreover, in this case, a user can not perform a subsequent shooting operation until the long exposure is over, and as a result, the user wastes time. In addition, from the viewpoint of power saving of the digital camera, a power consumption of the digital camera is also a problem.

As one of the technologies to solve such a problem, there is an invention disclosed in Japanese patent application publication number 2005-117395. Japanese patent application publication number 2005-117395 discloses that while performing a long exposure operation in a long exposure mode, a pixel signal is read out from approximately all pixels of an image sensor at a predetermined cycle, and the pixel signal is added each time the pixel signal is read out, and an image formed by the added pixel signal is displayed on a liquid crystal display (hereinafter, it is referred to as LCD), and when an ending of the long exposure operation is instructed by pressing a shutter release button fully again, or when a determination of obtaining a proper exposure amount is made based on a pixel value of the added pixel signal forming the image, a latest added image recorded in a second image recorder is set to be a recorded image.

According to the invention disclosed in Japanese patent application publication number 2005-117395, it is necessary for a user to press the shutter release button of the digital camera at all times of the long exposure. Even if a camera is stabilized by a tripod or the like, camera shake caused by a user's body such as hands and fingers is transmitted to the camera, and therefore it is difficult to achieve a high picture quality shooting in the long exposure without shake.

There is an invention disclosed in Japanese patent number 3399454, as another conventional technology to solve a problem in the long exposure. Japanese patent number 3399454 discloses that a pixel arrangement plane of an image sensor is divided into a field for displaying and a field for recording, and an exposure time of each field is settable to be different. When a shutter operation is performed, an exposure of the field for recording is started and a charge storage is performed in the field for displaying for a predetermined time, and an image formed on the basis of this charge signal is displayed on an LCD or the like as a display image. An exposure of the field for displaying for a predetermined time and a reading out of an image are repeatedly performed, and an obtained image each time is added to a previously displayed image and displayed. As a result, until the exposure of the field for recording is over, an image display is performed in a digital camera.

According to the invention disclosed in Japanese patent number 3399454, since only an image signal obtained in a part of the image sensor is used for displaying, in a case of checking an image displayed on a high-accuracy display device such as an LCD used for a recent digital camera, there is a limit to checking a subtle image blur.

Additionally, as still another conventional technology, there is an image apparatus disclosed in Japanese patent application publication number 2004-077713. This discloses that a camera shake detector which detects a state of the camera shake is provided, and in a case where there is an image blur which is judged based on the detected shake information, a user is informed of the image blur by the imaging apparatus before shooting, and thereby a shooting failure due to camera shake can be reduced.

According to the invention disclosed in Japanese patent application publication number 2004-077713, a possibility of camera shake occurring is informed by the imaging apparatus to a user before shooting, and thereby it is possible for the user to previously take a measure to prevent camera shake. However, even if a shooting condition before shooting is a condition which does not cause an image blur, and there is no warning, when an image blur occurs during exposure, the shooting becomes a failure as a result.

SUMMARY

An object of the present invention is to provide an imaging apparatus which is capable of performing a high picture quality shooting that is less affected by an image blur in a long exposure.

In order to achieve the above object, the embodiment of the present invention provides: an imaging apparatus having a shooting optical system and an image sensor, comprising: an image data producer which produces image data from an image of a photographic subject formed on the image sensor via the shooting optical system; an imaging controller which repeatedly outputs one picture unit of image data produced in a predetermined shooting time duration by the image data producer; an image data recorder which records the image data outputted by the imaging controller; a position detector which detects a change in position of the imaging apparatus and calculates an amount of displacement of the imaging apparatus from a position at a time point of the imaging apparatus taken as a reference based on the detected change in position; a position recorder which records the amount of displacement calculated by the position detector and time data related to the amount of displacement; a display section which displays a relationship between a shooting time of each image data of the image data recorder and the amount of displacement recorded by the position recorder, during exposure or at the end of exposure; and an adding processor which adds arbitrary image data of the image data recorder and produces an image.

In order to achieve the above object, the embodiment of the present invention provides: a computer program embodied on a computer readable medium for use in an imaging apparatus having a shooting optical system and an image sensor, comprising: a step of an image data production which produces image data from an image of a photographic subject formed on the image sensor via the shooting optical system; a step of an imaging control which repeatedly outputs one picture unit of image data formed in a predetermined shooting time duration by the step of the image data production; a step of an image data recording which records the image data outputted by the step of the imaging control; a step of a position detection which detects a change in position of the imaging apparatus and calculates an amount of displacement of the imaging apparatus from a position at a time point of the imaging apparatus taken as a reference based on the detected change in position; a step of a position recording which records the amount of displacement calculated by the step of the position detection and time data related to the amount of displacement; a step of a display which displays a relationship between a shooting time of each image data of the step of the image data recording and the amount of displacement recorded by the step of the position recording, during exposure or at the end of exposure; and a step of an adding processing which adds arbitrary image data of the step of the image data recording and produces an image.

DETAILED DESCRIPTION OF THE PREFERRED EMBODIMENT

[Embodiment]

Hereinafter, with reference to the drawings, an embodiment of the imaging apparatus according to the present invention will be explained.

Figure 1:
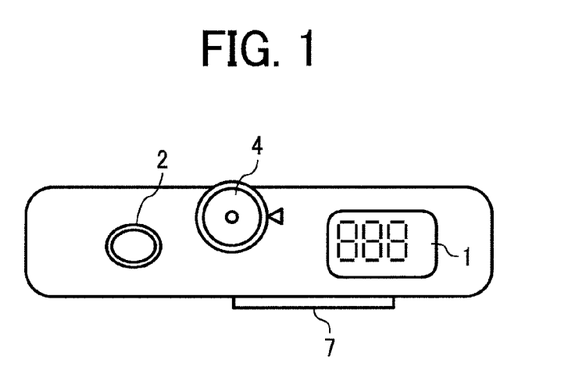
FIG. 1 is a plan view of a digital camera as an example of an imaging apparatus according to the present invention.
Figure 2:
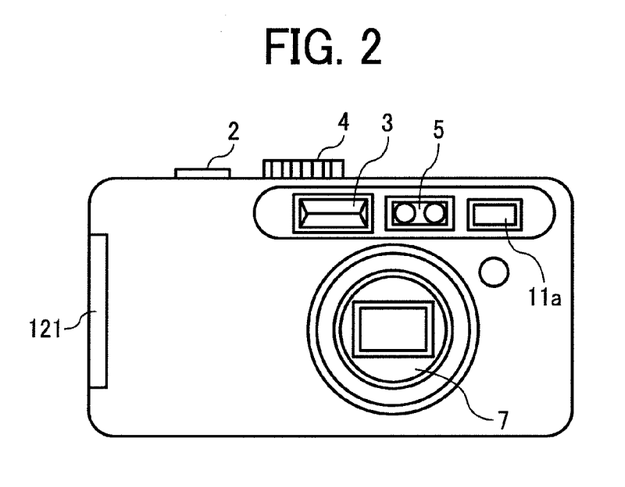
FIG. 2 is a front view of the digital camera of FIG. 1.
Figure 3:
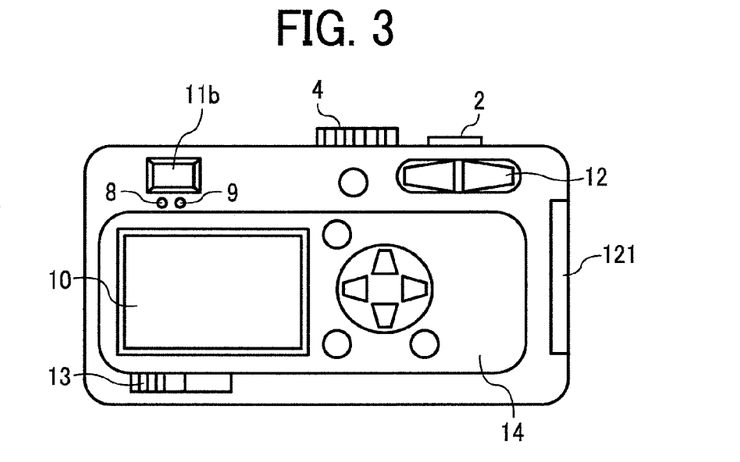
FIG. 3 is a back view of the digital camera of FIG. 1.

Firstly, as an example of the imaging apparatus according to the present invention, with reference to FIGS. 1, 2, and 3 illustrating an example of an exterior view of a digital camera, an operation section, a display and so on, which are necessary to carry out the present invention, will be explained.

As illustrated in FIG. 1, a digital camera as an imaging apparatus has a sub LCD 1, a shutter release button 2, and a dial key 4 on an upper side of the digital camera. Other than the above, the digital camera often has a power switch button, a function button and so on. The dial key 4 is a dial which sets various modes when shooting, and by which various modes for shooting such as a moving image mode, an ordinary still image mode, a long exposure mode and so on are selected and determined.

On a front side of the digital camera, as illustrated in FIG. 2, a flash emitting section 3, a distance measuring unit 5, a lens barrel unit 7, and an object plane 11a of an optical viewfinder are disposed. On one side part of the digital camera, a memory card slot 121 is disposed and covered with a lid. The lens barrel unit 7 is a collapsible type, and as illustrated in FIG. 1, when it is not used, each member of a lens cylinder and the like included in the lens barrel unit 7 is stored inside the digital camera, and the digital camera becomes in a compact state. On the other hand, when it is used, each member included in the lens barrel unit 7 is extended outward from a main body of the digital camera, and the digital camera becomes in a photographable state and zooming which serially changes a focal length can be performed.

On a back side of the digital camera, as illustrated in FIG. 3, an eye piece 11b of the optical viewfinder is disposed in the upper left, and below the eye piece 11b, an AF (auto focus) LED (light-emitting diode) 8 indicating an AF operation and a flash LED 9 indicating an operation of the flash emitting section 3 are disposed. An LCD 10 is disposed on the back side of the digital camera, largely occupying the left of the back side. Below the LCD 10, a switch 13 is disposed. On the upper right of the back side of the digital camera, a zoom operation switch 12, which moves the lens barrel unit 7 toward a telephoto end or a wide-angle end, is disposed. Below the zoom operation switch 12, an operation key unit 14 where a playback button, an OK cross key, a deletion key, self-timer key and the like are disposed is provided. The operation key unit 14 is equivalent to an operation key unit SW1 to SW13 which is explained later.

Figure 4:
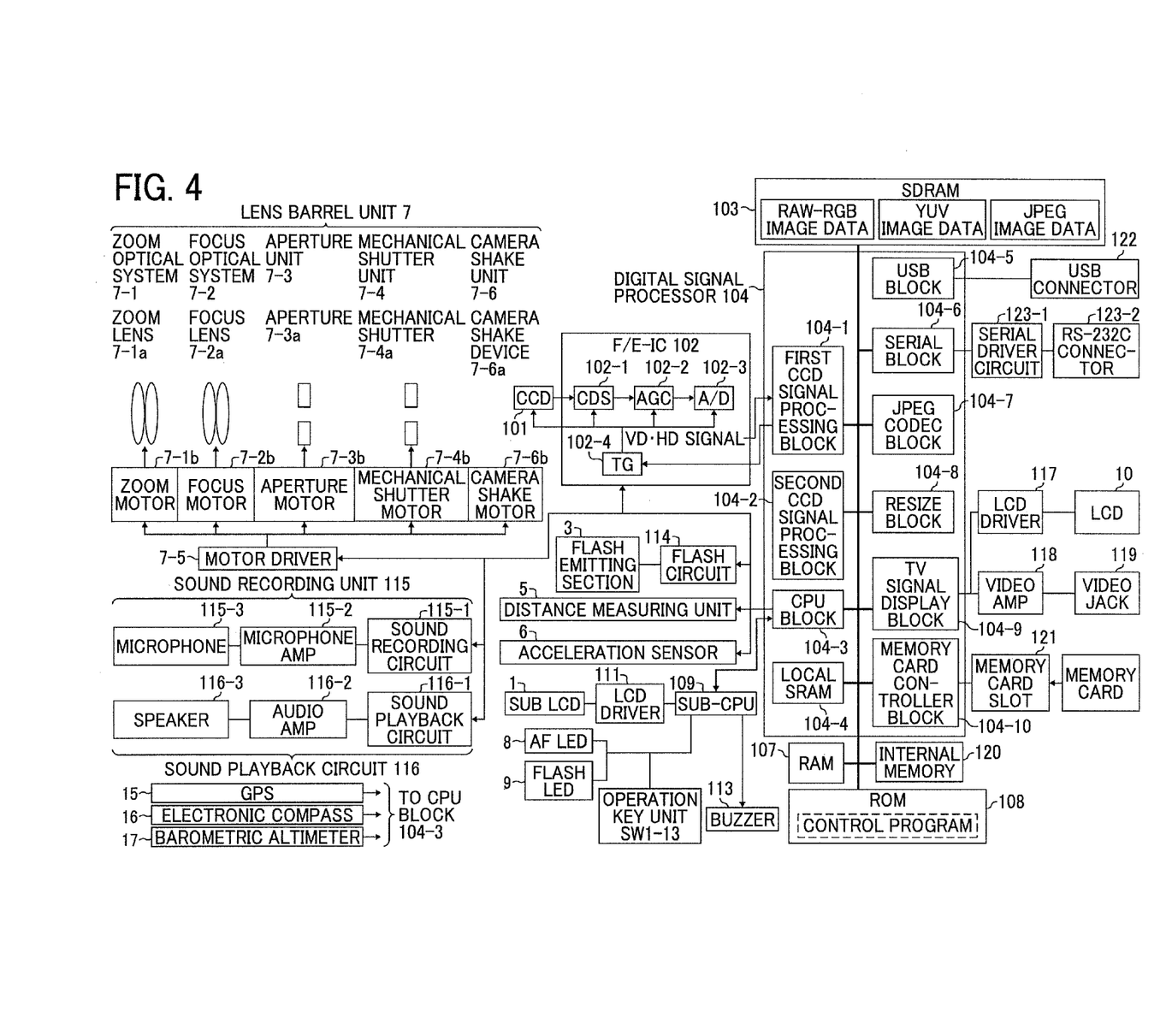
FIG. 4 is a block diagram illustrating a control system in the imaging apparatus according to the present invention.

FIG. 4 is a function block diagram illustrating a configuration example of a control system of the imaging apparatus in the embodiment of the present invention. In FIG. 4, the lens barrel unit 7 has a zoom optical system 7-1, a focus optical system 7-2, an aperture unit 7-3, a mechanical shutter unit 7-4, a motor driver 7-5, and a camera shake unit 7-6. The zoom optical system 7-1 includes a zoom lens 7-1a where an optical image of a photographic subject passes, and a zoom lens drive motor (zoom motor) 7-1b. The focus optical system 7-2 includes a focus lens 7-2a, and a focus lens drive motor (focus motor) 7-2b. The aperture unit 7-3 includes an aperture 7-3a, and an aperture drive motor (aperture motor) 7-3b. The mechanical shutter unit 7-4 includes a mechanical shutter 7-4a, and a mechanical shutter drive motor (mechanical shutter motor) 7-4b. The camera shake unit 7-6 has a camera shake device 7-6a and a camera shake device drive motor (camera shake motor) 7-6b. The motor driver 7-5 drives each motor. The motor driver 7-5 is controlled based on an operation based on a manipulated input of the operation key unit SW1 to SW13. That is, on the basis of the manipulated input of the operation key unit SW1 to SW13, a drive command signal is outputted from a CPU (central processing unit) block 104-3 in a later-described digital signal processor (hereinafter, it is referred to as DSP). And the motor driver 7-5 is driven by this command signal, and an operation of each part of the lens barrel unit 7 is controlled.

In a ROM (read-only memory) 108 illustrated in FIG. 4, a control program written in a code readable in the CPU block 104-3, and various parameters used for controlling are stored. When this digital camera is turned on, the above program is loaded to a main memory, which is not illustrated. The CPU block 104-3 controls the operation of each part of the apparatus based on the above program, and data and the like which are necessary for control are temporarily stored in a RAM (random access memory) 107 and a local SRAM 104-4 in the DSP 104. A rewritable flash ROM is used as the ROM 108, and thereby it is possible to change the control program and the various parameters used for controlling which are recorded in the ROM 108, and a function of the digital camera is capable of upgrading easily. That is, the control program stored in the ROM 108 includes a computer program in an imaging apparatus having a shooting optical system and an image sensor including a step of an image data production, a step of an imaging control, a step of an image data recording, a step of a position detection, a step of a position recording, a step of a display, and a step of an adding processing. The step of the image data production produces image data from an image of a photographic subject formed on the image sensor via the shooting optical system. The step of the imaging control repeatedly outputs one picture unit of image data produced in a predetermined time duration by the step of the image data production. The step of the image data recording records the image data outputted by the step of the imaging control. The step of the position detection detects a change in position of the imaging apparatus from a position at a time point of the imaging apparatus taken as a reference and calculates an amount of displacement of the imaging apparatus based on the change in position. The step of the position recording records the amount of displacement calculated by the step of the position detection and time data related to the amount of displacement. The step of the display displays a relationship between a shooting time of each image data of the step of the image data recording and the amount of displacement recorded by the step of the position recording, during exposure or at the end of the exposure. The step of the adding processing adds arbitrary image data of the step of the image data recording and produces an image.

In a position of forming an image of a photographic subject by the lens barrel unit 7, a CCD (charge-coupled device) 101 is disposed as an image sensor. The CCD 101 is a solid-state image sensor to photoelectrically convert an optical image, and is an area sensor in which many pixels are disposed two-dimensionally. A signal photoelectrically converted by each pixel of the CCD 101 is inputted to an F/E (front-end)-IC 102. The image data producer producing image data from the image of the photographic subject formed on the CCD 101 includes the F/E-IC 102, and the F/E-IC has a CDS (correlated double sampler) 102-1, an AGC (automatic gain controller) 102-2, and an A/D (analog-digital converter) 102-3. The CDS 102-1 performs a correlated double sampling for an image denoising. The AGC 102-2 performs a gain adjustment. The A/D 102-3 converts an analog signal to a digital signal. In addition, the F/E-IC 102 has a TG (timing generator) 102-4. The TG 102-4 generates a drive timing signal of the F/E-IC 102 based on a vertical synchronization signal (hereinafter, it is referred to as VD) and a horizontal synchronization signal (hereinafter, it is referred to as HD) supplied from a first CCD signal processing block 104-1 in the DSP 104. The CCD 101 is controlled by the CPU block 104-3 based on the timing signal generated in the TG 102-4. In other words, the imaging controller includes parts including the first CCD signal processing block 104-1 and the TG 102-4. The imaging controller repeatedly outputs one picture unit of image data produced in a predetermined shooting time duration by the image data producer. The predetermined shooting time duration can be configured to be set and changed arbitrarily by the image data producer and the imaging controller.

The DSP 104 has each function block as follows. That is, the DSP 104 has the first CCD signal processing block 104-1, a second CCD signal processing block 104-2, the CPU block 104-3, a local SRAM 104-4, a USB block 104-5, a serial block 104-6, a JPEGCODEC block 104-7, a RESIZE block 104-8, a TV signal display block 104-9, and a memory card block 104-10. The first CCD signal processing block 104-1 performs a white balance setting and a gamma setting on image data outputted from the CCD 101 via the F/E-IC 102, and as described above, supplies the VD signal and the HD signal. The second CCD signal processing block 104-2 converts image data to brightness data and color difference data by a filtering operation. The CPU block 104-3 controls the above-described operations of each part of the apparatus. The local SRAM 104-4 temporarily stores the above-described control program and various parameters used for controlling. The USB block 104-5 performs a USB communication with an external device such as a personal computer (PC). The serial block 104-6 performs a serial communication with an external device such as a PC. The JPEGCODEC block 104-7 performs JPEG compression and extension of image data. The RESIZE block 104-8 expands and reduces a size of image data by an interpolation operation. The TV signal display block 104-9 converts image data to a video signal for displaying on an external display device such as an LCD, a TV and so on. The memory card block 104-10 performs a control of a memory card which records shot image data.

Image data is temporarily stored in an SDRAM 103, when various operations are performed on image data in the DSP 104. The stored image data, for example, are "RAW-RGB image data", "YUV image data", "JPEG image data" and so on. The RAW-RGB image data is image data which is in a state where the white balance setting and the gamma setting have been performed in the first CCD signal processing block 104-1 after being loaded from the CCD 101 via the F/E-IC 102. The YUV image data is image data which is in a state where a conversion to brightness data and color difference data has been performed in the second CCD signal processing block 104-2. The JPEC image data is image data which is in a state where the JPEG compression has been performed in the JPEGCODEC block 104-7. The image data recorder, which records image data outputted from the imaging controller, includes the SDRAM 103. The RAM 107 can have a function of recording image data outputted from the imaging controller as the image data recorder, instead of the SDRAM 103.

The memory card slot 121 is a slot where a memory card is removable. An internal memory 120 is a memory in which shot images can be recorded, even in a case where the memory card is not inserted in the memory card slot 121. An LCD driver 117 is a drive circuit which drives the LCD 10 and also has a function of converting the video signal outputted from the TV signal display block 104-9 to a signal for displaying on the LCD 10. The LCD 10 has roles of monitoring a state of a photographic subject before shooting, displaying a shot image, displaying image data recorded in the memory card or the internal memory, and so on.

A video AMP (amplifier) 118 is an amplifier which converts an impedance of the video signal outputted from the TV signal display block 104-9 to 75 Ω. A video jack 119 is a jack which connects the imaging apparatus to an external display device such as a TV. A USB connector 122 is a connector which performs a USB connection to an external device such as a PC. A serial driver circuit 123-1 is a circuit which performs a voltage conversion of an output signal of the serial block 104-6 to perform a serial communication to an external device such as a PC. An RS-232C connector 123-2 is a connector which performs a serial connection to an external device such as a PC.

A SUB-CPU 109 is a CPU in which a ROM and a RAM are embedded. The SUB-CPU 109 outputs an output signal of the operation key unit SW1 to SW13 as user's operation information to the CPU block 104-3. In addition, the SUB-CPU 109 outputs a signal which controls operations of the sub LCD 1, the AFLED 8, the flash LED 9, and a buzzer 113 based on a state of the camera outputted from the CPU block 104-3. The sub LCD 1 is a display section on which the number of photographable pictures is displayed, for example. The LCD driver 111 is a drive circuit which drives the sub LCD 1 by an output signal of the SUB-CPU 109. The AFLED 8 is an LED which displays a focus state when shooting. The flash LED 9 is an LED which indicates a charging state of the flash. The AFLED 8 and the flash LED 9 can be used for a different display purpose such as "accessing memory card." The operation key unit SW1 to SW13 has various key switches and the like which a user operates.

The flash emitting section 3, and a flash circuit 114 are devices which increase brightness of a photographic subject in the case of lack of brightness of the photographic subject under natural light. When shooting in a dark place or a photographic subject is dark, a flash emission signal is sent from the DSP 104 to the flash circuit 114. By this signal, the flash circuit 114, synchronizing with a shutter release operation, drives the flash emitting section 3 to emit light and illuminate the photographic subject brightly.

The distance measuring unit 5 is a device which measures a distance between a camera and a photographic subject. In the case of a digital camera, a CCD-AF method by which the contrast of a photographic subject forming on an image sensor (CCD) is detected, and a lens is moved to a position where the contrast is highest, and the digital camera is brought into focus is widely used. However, as for the CCD-AF method, there is a problem in that a focus operation is slow because the position where the contrast is high is detected by moving the lens little by little. Consequently, information on the distance between the photographic subject is constantly obtained by use of the distance measuring unit 5, and the lens is moved to a focus position at once based on the above information on the distance, and thereby speeding-up of the focus operation is achieved.

An acceleration sensor 6 is a device which detects an acceleration of an imaging apparatus in a horizontal surface and a direction vertical to the horizontal surface. The acceleration sensor 6 detects a direction and an amount of camera shake, and additionally detects a posture of the imaging apparatus. The position detector, which detects a change in position of the imaging apparatus and calculates an amount of displacement of the imaging apparatus from a position at a time point of the imaging apparatus taken as a reference based on the detected change in position, includes the acceleration sensor 6. The position recorder records the amount of displacement calculated by the position detector and time data related to the amount of displacement. The RAM 107 can be used as this position recorder, for example.

A GPS (global positioning system) 15 is a global position determination system by use of an artificial satellite and a device which measures lat/long (latitude and longitude). An electronic compass 16 is a device which detects small magnetism which the earth gives off, and measures a direction. A barometric altimeter 17 is a device which calculates altitude by measuring an atmospheric pressure and comparing to a reference value.

A sound recording unit 115 has a sound recording circuit 115-1, a microphone AMP (amplifier) 115-2, and a microphone 115-3. The microphone 115-3 converts a sound from a surrounding environment of a user or the like to a sound signal and inputs the sound signal to the microphone AMP 115-2. The microphone AMP 115-2 amplifies the inputted sound signal. The sound recording circuit 115-1 records the amplified sound signal. The sound playback unit 116 has a sound playback circuit 116-1, an audio AMP (amplifier) 116-2, and a speaker 116-3. The sound playback circuit 116-1 converts the recorded sound signal to a signal which can be outputted from a speaker. The audio AMP 116-2 amplifies the converted sound signal and drives the speaker. The speaker 116-3 outputs the sound signal.

Figure 5:
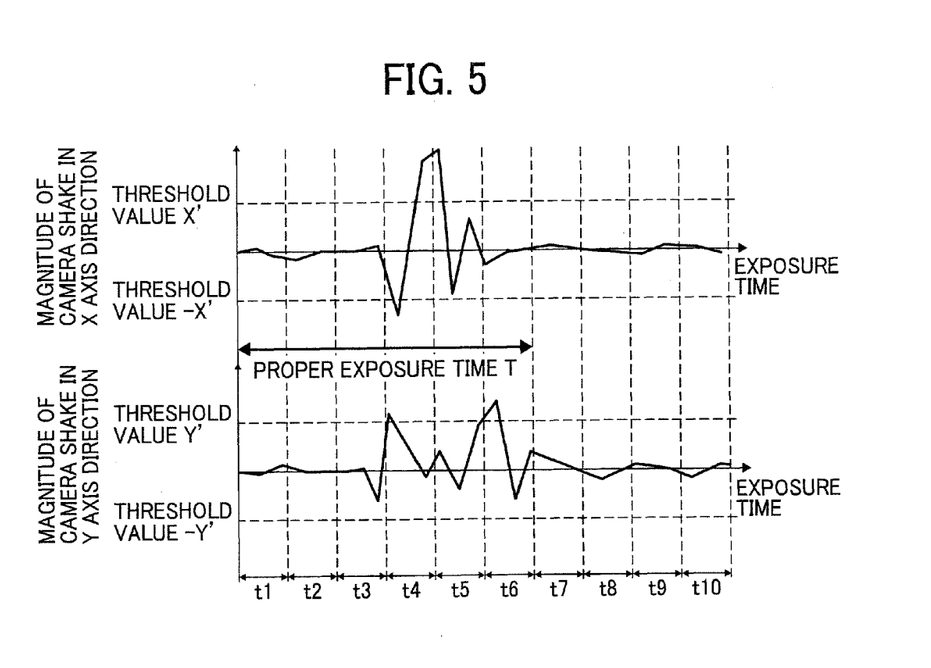
FIG. 5 illustrates a display example of a relationship between a shooting time and shake of the imaging apparatus by the imaging apparatus according to the present invention.

Thus far, a configuration example of a hardware part of the imaging apparatus according to the present invention has been explained. The present invention makes it possible to eliminate an influence of an image blur which often occurs in a long exposure, for example, in such hardware configuration. FIG. 5 illustrates a displacement of an imaging apparatus during exposure, in other words, an example of a change in time of imaging apparatus shake. The display section includes the LCD 10, for example. The display section includes the LCD 10 which displays a relationship between a shooting time of each image data of the image data recorder and the amount of displacement recorded by the position recorder.

An upper half of FIG. 5 illustrates a relationship between a magnitude of imaging apparatus shake in an X axis direction (horizontal direction) and an elapsed time, and a lower half of FIG. 5 illustrates a relationship between a magnitude of imaging apparatus shake in a Y axis direction (gravity direction) and an elapsed time. That is, the position detector detects position data of the imaging apparatus in the X axis direction (horizontal direction) and the Y axis direction (gravity direction) on a surface perpendicular to a shooting optical axis of the shooting optical system. Here, a threshold value of shake in the X axis direction (horizontal direction) is taken as ±X', and a threshold value of shake in the Y axis direction (gravity direction) is taken as ±Y'. In a case where shake in each direction does not exceed each threshold value, a pixel signal is added. In an example illustrated in FIG. 5, time periods where shake in the X axis direction exceeds the threshold value in the X axis direction (horizontal direction) are t4 and t5 and time periods where shake in the Y axis direction (gravity direction) exceeds the threshold value in the Y axis direction are t4 and t6. Accordingly, except for the time periods of t4, t5 and t6 where the magnitude of shake in the X axis direction and the Y axis direction exceeds each threshold value, pixel signals are added and an image is produced. The adding processor, which adds arbitrary image data recorded in the image data recorder and an image is produced, includes a configuration part including the DSP 104, the control program in the ROM 108, and the SDRAM 103 or the RAM 107.

Thus, the following shooting can be performed by calculating a size of an image blur per time period.

[Display of Amount of Displacement of Photographic Subject in Image During Long Exposure and Production of Image of Arbitrary Time Period]

When starting a long exposure, the acceleration sensor 6 included in the position detector detects a change in position of the imaging apparatus, and calculates an amount of displacement of the imaging apparatus from a position at a time point of the imaging apparatus taken as a reference based on the detected change in position, and the position recorder records the amount of displacement calculated by the position detector and time data related to the amount of displacement. A user selects a necessary time period for a desired image by a selector while checking a display outputted as a graph expressing a relationship between a shooting time and an amount of displacement of the imaging apparatus, during exposure or at the end of exposure. By this operation, image data of the selected time period is added and an image is produced.

The position detector includes a calculator of an amount of displacement of a photographic subject, which calculates an amount of displacement of a photographic subject included in image data shot per predetermined shooting time duration from a position of the photographic subject of arbitrary image data taken as a reference, by use of position data in the X axis direction (horizontal direction) and the Y axis direction (gravity direction) on the surface perpendicular to the shooting optical axis of the shooting optical system. A position of a photographic subject of image data taken as a reference is arbitrarily selected by an execution of starting of the long exposure. The image data where the amount of displacement of the photographic subject in each of the gravity direction and the horizontal direction is calculated by the calculator of the amount of displacement of the photographic subject is outputted to the adding processor, after the calculated amount of displacement of the photographic subject is corrected.

[Display of Proper Exposure Time]

As illustrated in FIG. 5, in the imaging apparatus, a proper exposure time based on brightness of a photographic subject is calculated by a proper exposure time calculator, and a calculation result can be displayed. Displaying the proper exposure time in a graph expressing a relationship between a shooting time and an amount of displacement of an imaging apparatus makes it possible to be clear which time period is preferable to select when a user selects the time period for an image production.

[Automatic Selection of Time Period]

In an example illustrated in FIG. 5, the magnitude of shake in the X axis direction and the magnitude of shake in the Y axis direction are larger than the threshold values X' and Y', respectively, in time periods t4, t5, and t6, and image data in the time periods t4, t5, and t6 is automatically deleted, and an image is produced. The threshold value X' or the threshold value Y' can be set arbitrarily by a user by having a threshold value inputting section.

The above-described operation is performed by an operation of the CPU-block 104-3 in the DSP 104 in accordance with a control program in the ROM 108 based on a detection signal by the acceleration sensor 6 in the block diagram illustrated in FIG. 4.

Figure 6:
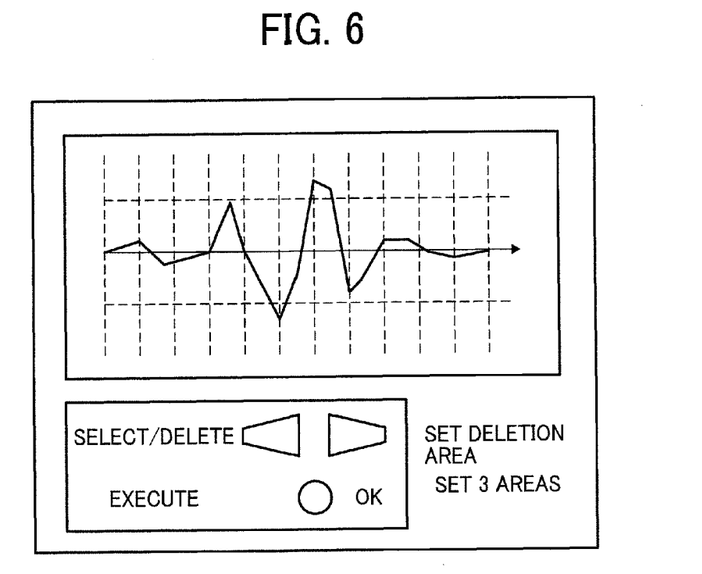
FIG. 6 illustrates another display example of the relationship between the shooting time and shake of the imaging apparatus by the imaging apparatus according to the present invention.

From FIG. 6, more specific cases regarding the above-described operation are illustrated. In FIG. 6, only one example of shake in the X axis direction and shake in the Y axis direction displayed on the LCD 10 after shooting is illustrated. Threshold values in the vertical direction are illustrated by horizontal lines including a center line in the horizontal direction and set at a constant interval in the vertical direction, respectively. Units such as numbers, time, and angles can be expressed by the horizontal axis and the vertical axis. The center of the vertical axis (Y axis) expresses a position of the imaging apparatus at a starting point of shooting. In a frame below a screen of the LCD 10, a left button for a selection, a right button for a deletion, and an OK button for an execution are disposed. A time period where shake is large is selected and deleted by operating these buttons.

Figure 7:
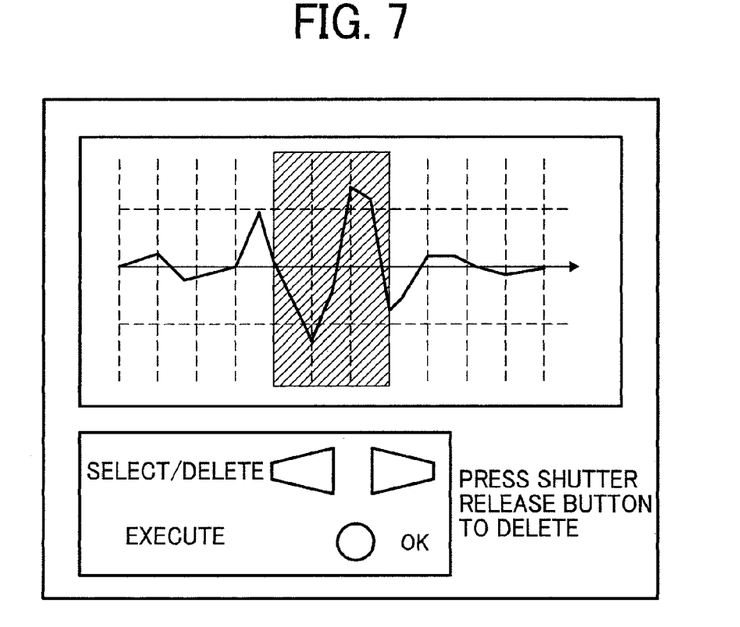
FIG. 7 illustrates an example indicating time periods to be deleted in the display example of FIG. 6.

FIG. 7 illustrates an example of the above selection and deletion. As illustrated in FIG. 6, there are three continuous time periods where shake is larger than the threshold value, accordingly the user selects these three time periods by the above buttons. These buttons are the selector which selects arbitrary image data from the display section. The above three time periods are time periods to be deleted, therefore they are displayed on the monitor. A parallel diagonal lined part in FIG. 7 is a time period to be deleted, and as described above, there are three time periods to be deleted. Thus, after the time period to be deleted is selected, the selected time period is deleted by operations of pressing the shutter release button and the like, for example. And when image data in remaining time periods is added and an image is produced, a high quality image less affected by shake can be obtained.

Figure 8:
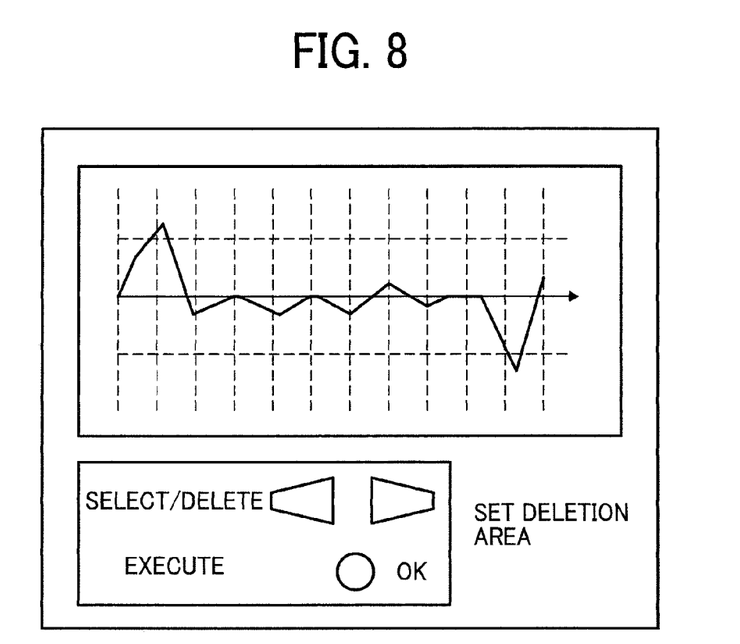
FIG. 8 illustrates still another display example of the relationship between the shooting time and shake of the imaging apparatus by the imaging apparatus according to the present invention.
Figure 9:
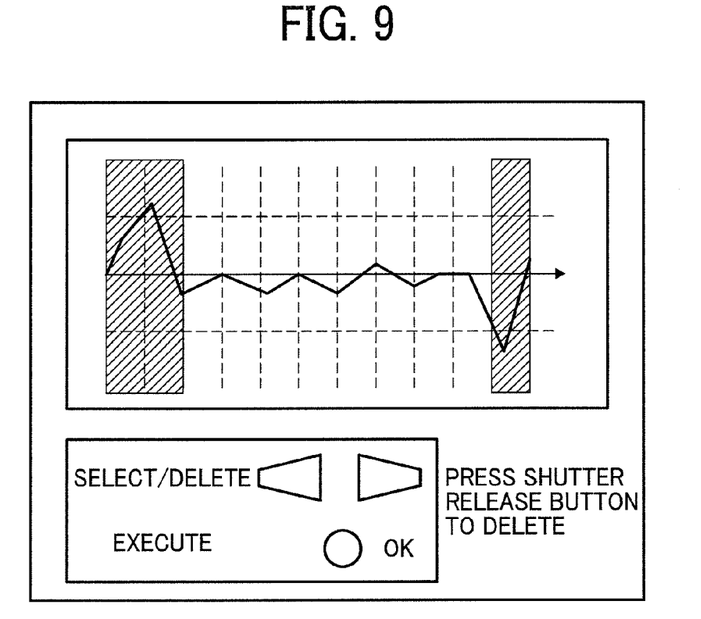
FIG. 9 illustrates still another display example of the relationship between the shooting time and shake of the imaging apparatus by the imaging apparatus according to the present invention.

FIG. 8 illustrates another example of shake displayed on the LCD 10 after shooting. This is a typical example of camera shake occurring at a shutter operation. When the shutter release button is pressed and released by a user, shake occurs, and exceeds the threshold value. When the shutter release button is pressed, shake occurs greatly in two time periods from the left, and when the shutter release button is released, shake occurs greatly in one time period. Accordingly, these three time periods are set as deletion areas. FIG. 9 illustrates a state where the deletion areas (parallel diagonal lined parts) are set. In this state, image data in the above time periods is deleted, for example, by pressing the shutter release button. Also in this case, when image data in remaining time periods is added and an image is produced, a high quality image less affected by shake can be obtained.

Figure 10:
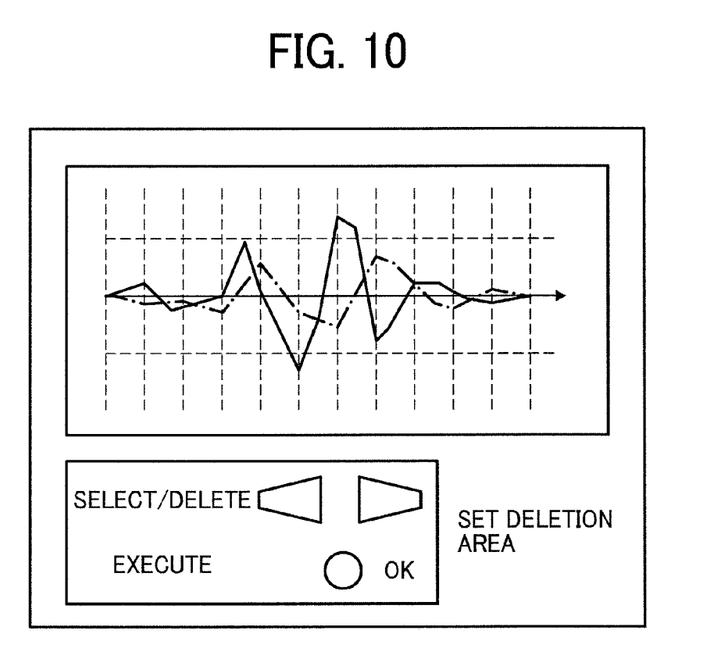
FIG. 10 illustrates still another display example of the relationship between the shooting time and shake of the imaging apparatus by the imaging apparatus according to the present invention.

As examples illustrated in FIGS. 6 to 9, FIG. 10 is an example of illustrating not only shake in the horizontal direction (X axis direction) but also shake in the vertical direction (Y axis direction). In FIG. 10, one of a graph expressed by a solid line and a graph expressed by a chain line illustrates shake in the horizontal direction and the other illustrates shake in the vertical direction. According to this example, a state of shake can be recognized in both of the horizontal direction and the vertical direction. Therefore, image data in a time period where shake exceeds the threshold value in each direction can be deleted, and image data in remaining time periods is added, and an image is produced. And thus, a high quality image less affected by shake can be obtained.

In examples illustrated in FIGS. 6 to 10, not only image data in the time period where shake exceeds the threshold value can be deleted manually by a user, but also image data in the time period where an amount of shake is larger than the threshold value can be deleted automatically, based on a judgment of shake in the CPU-block 104-3, for example, by comparing the detected amount of shake with the threshold value per time period. In this case, a judgment section, which judges whether the amount of displacement calculated by the position detector is larger than a predetermined threshold value or not in each time period of shot image data recorded in the image data recorder, includes the CPU-block 104-3.

Figure 11:
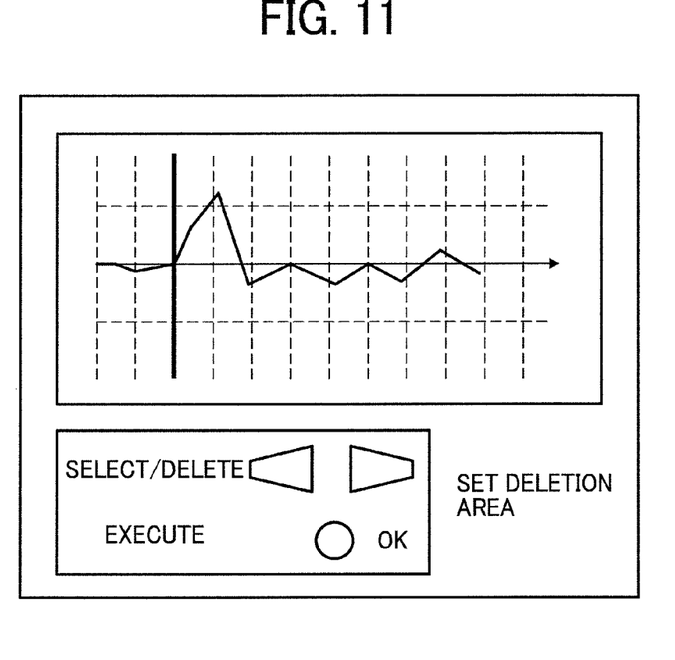
FIG. 11 illustrates still another display example of the relationship between the shooting time and shake of the imaging apparatus by the imaging apparatus according to the present invention.

In FIG. 11, another example of shake displayed on the LCD 10 after shooting is illustrated, and in addition, a state of shake before a shutter operation is also illustrated. In FIG. 11, a bold vertical line in the screen illustrated as the LCD 10 expresses a starting point of the shutter operation, and on the left of this bold line, the state of shake before starting the shutter operation is illustrated. From the example illustrated in FIG. 11, it is apparent that shake occurs greatly by starting shooting by the shutter operation. It is apparent to a user by looking at the LCD 10 that a main reason for shake is the shutter operation, therefore the user can pay attention to subsequent shutter operations. A setting of a deletion of image data can not be performed in a time period before starting shooting, because image data is not stored before starting shooting by the shutter operation.

Figure 12:
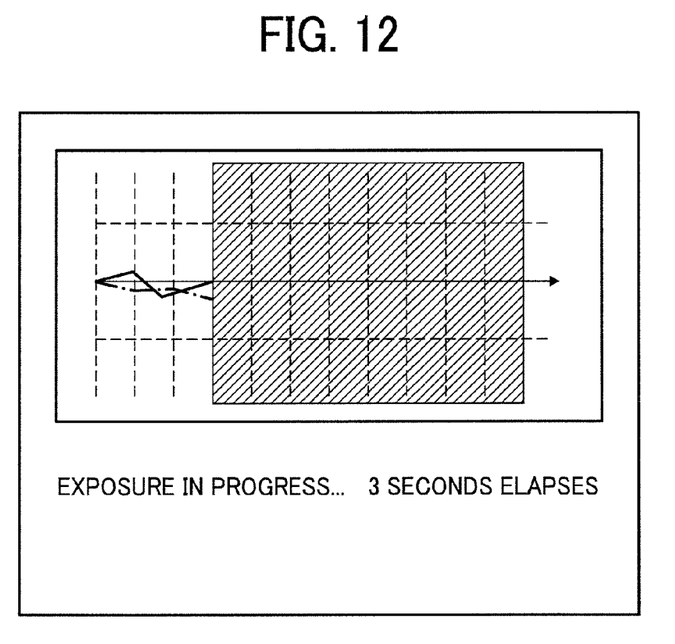
FIG. 12 illustrates still another display example of the relationship between the shooting time and shake of the imaging apparatus by the imaging apparatus according to the present invention.
Figure 13:
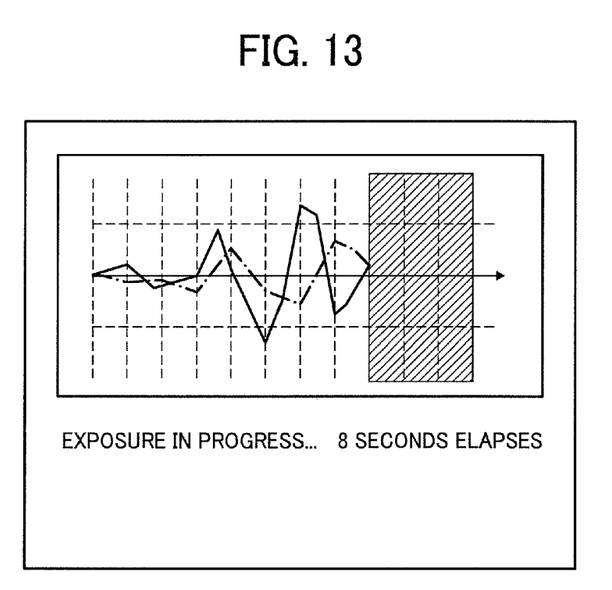
FIG. 13 illustrates an example of a case where time passes further from a state illustrated in FIG. 12.

FIGS. 12 and 13 illustrate another example of shake displayed on the LCD while shooting in a long exposure mode. Time periods expressed by parallel diagonal lines in FIGS. 12 and 13 illustrate time periods where an exposure operation is yet to be performed. In FIG. 12, an example where 3 seconds have passed since the beginning of the exposure is illustrated, and in a lower part of the LCD 10, a state where the exposure is in progress and 3 seconds of an exposure time have passed since the beginning of the exposure is illustrated. In FIG. 13, the exposure further continues, and a state where 8-second exposure time has passed is illustrated. Therefore, in the lower part of the LCD 10, a state where the exposure is in progress and 8 seconds of the exposure time have passed since the beginning of the exposure is illustrated. A setting and a deletion of the time period where there is image data to be deleted can not be performed during exposure, therefore a display of the lower part of the LCD is different from the above-described example.

[Automatic Extension of Exposure Time]

Figure 14:
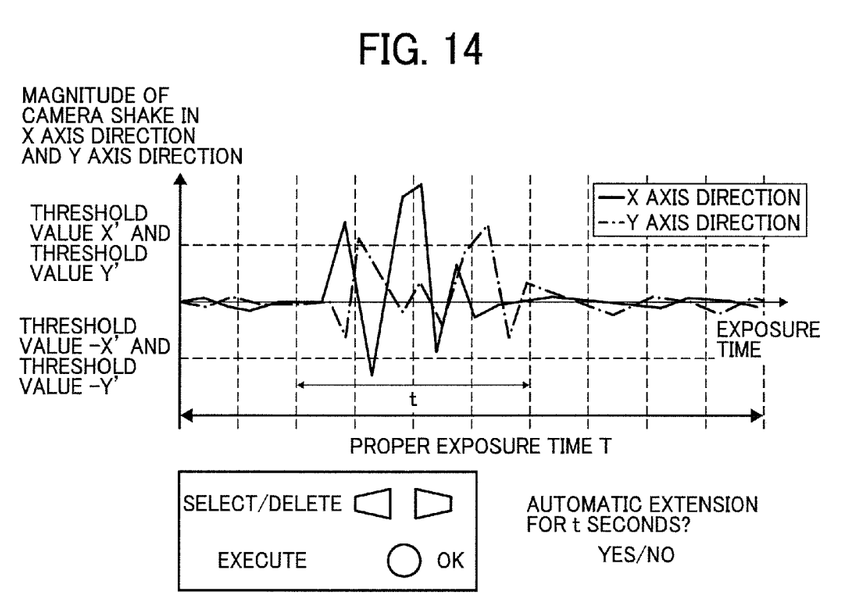
FIG. 14 illustrates still another display example of the relationship between the shooting time and shake of the imaging apparatus by the imaging apparatus according to the present invention.

FIG. 14 illustrates a display example of a function of an automatic extension of the exposure time, in the case of ending shooting in the long exposure mode. Here, when a total time of time periods where camera shake exceeds a threshold value is taken as "t (seconds)", a user determines whether an extension of the exposure for "t (seconds)" is further performed or not. Thus, the judgment section calculates the total time of the time periods where shake exceeds the threshold value, and the exposure for only the same length of time as the total time is extended, and thereby a proper exposure time can be obtained. In the function of the automatic extension of the exposure time, the user can select whether an extension of shooting (exposure) is performed or not.

[Judgment of Magnitude of Camera Shake by Integration]

Figure 15:
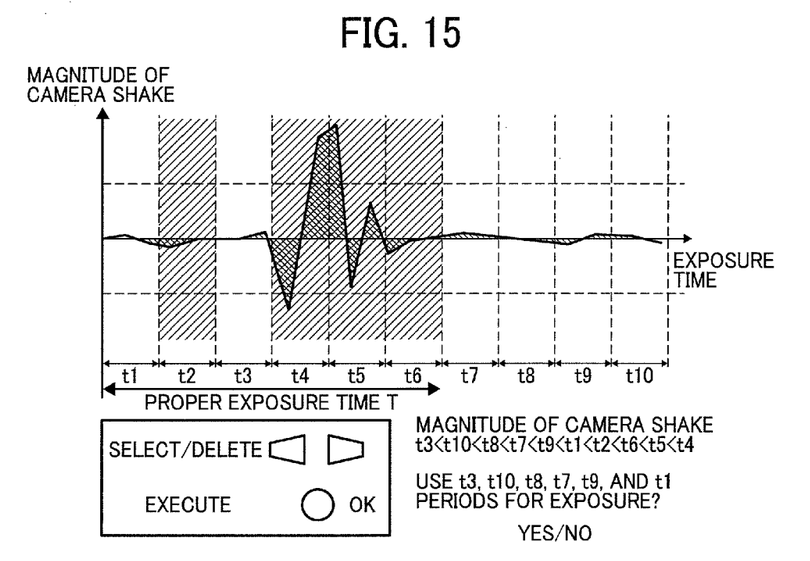
FIG. 15 illustrates still another display example of the relationship between the shooting time and shake of the imaging apparatus by the imaging apparatus according to the present invention.

FIG. 15 illustrates a display example where in a case where shooting ends in a long exposure mode, an integration value of a magnitude of camera shake in each time period of t1 to t10 is calculated, and the calculated integration value is ranked, and the time period where shake is smaller is selected preferentially. Image data where an image blur is suppressed at minimum can be obtained by this function. That is, based on the amount of displacement calculated by the position detector, an integration value of a magnitude of camera shake is calculated per shooting time period, image data of the time period where the integration value is small is preferentially outputted to the adding processor.

[Multiple Times of Addition of Image Data]

Figure 16:
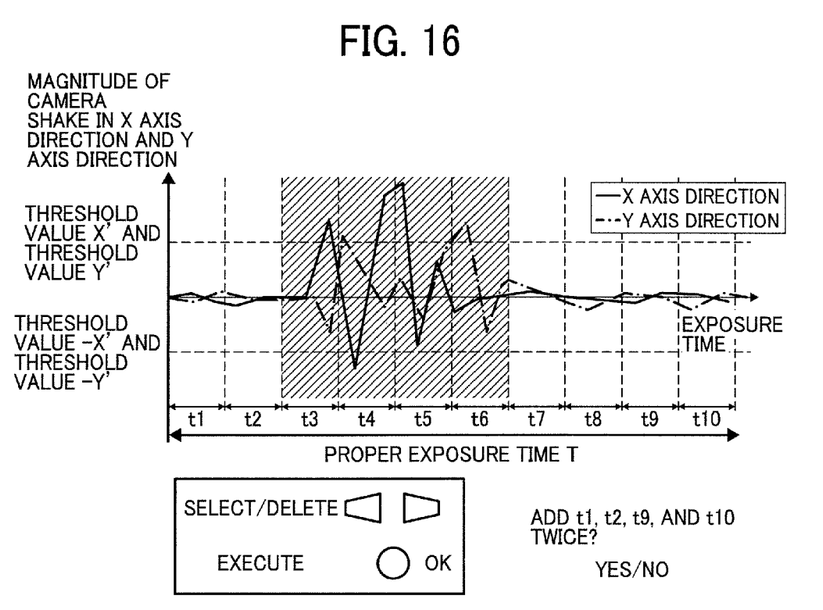
FIG. 16 illustrates still another display example of the relationship between the shooting time and shake of the imaging apparatus by the imaging apparatus according to the present invention.

FIG. 16 illustrates a display example of multiple times of addition of image data, in a case where shooting ends in a long exposure mode, and in a case where shooting stops. In the example illustrated in FIG. 16, in time periods of t3, t4, t5, and t6, a magnitude of camera shake exceeds predetermined threshold values. Image data of the time periods of t3, t4, t5, and t6 where the magnitude of shake exceeds the threshold values is not used, and image data of time periods of t1, t2, t9, and t10 where the magnitude of shake is within the threshold values and shake is small is added twice. That is, a total time of the time periods (t3, t4, t5 and t6) where shake judged by the judgment section is larger than the predetermined threshold values is taken as "t'", a total time of time periods (t1, t2, t9, and t10) where shake judged by the judgment section is smaller than the predetermined threshold values is taken as "t". And only the image data where shake judged by the judgment section is smaller than the predetermined threshold values is multiplied by (t'+t)/t, and then outputted to the adding processor. Therefore, when a total time of the exposure time where shake is small is shorter than a proper exposure time, an image is produced at proper brightness. This function is not capable of extending the exposure time freely, therefore it is good for a case where an image with less influence of shake is needed.

It is widely known that camera shake occurs, when a large force is added to the imaging apparatus at the moment of pressing a shutter release button for shooting by a user, even if the imaging apparatus is mounted on a tripod. It is possible to reduce an occurrence of shake by use of a shutter release cable and a remote shutter release device, however carrying these equipment and device with the imaging apparatus is troublesome for a user. According to the imaging apparatus of each of the above examples, even if shake occurs due to an operation of a shutter release button directly by the user, time periods where large camera shake occurs can be informed after shooting, and image data of the time periods can be deleted, and only remaining favorable image data can be added, therefore image data less affected by shake and having high picture quality can be produced.

In the example illustrated in FIG. 4, an image sensor using a CCD type has been explained, however an image sensor using a CMOS type can be used. In a case where the image sensor using the CCD type is used, an exposure stops while a pixel signal is transferred, however a pixel signal can be outputted in a line unit during exposure, therefore there rarely are time periods where the exposure stops. In the case of a long exposure, if the image sensor using the CCD type is used, a transferring time of a pixel signal with respect to an exposure time is short enough that it can be ignored, however in the case of a comparatively short exposure time, it is preferable to use the image sensor using the CMOS type. In addition, when the image sensor using the CCD type is used, a mechanical shutter can be closed while a pixel signal is transferred, and if brightness of a photographic subject is low, a time period where an exposure stops becomes shorter when the pixel signal is transferred without closing the mechanical shutter during exposure. However, in a case where a photographic subject with partially extremely high brightness is shot, quality of an image of the photographic subject is improved by closing the mechanical shutter.

The above explanation has been described on the assumption of a long exposure operation in an easy-to-understand manner, but even in a case of loading a plurality of image signals at a one-time shooting operation, the technique disclosed in the present invention can be applied.

For example, when considering a hand-held shooting, camera shake occurs easily for a long focus shooting lens, therefore a longer exposure time than 1/(focal length), which is generally known, can be a guideline of the long exposure. In the case of a longer exposure than a case where the exposure time is 36 msec when using a lens of f=28 mm, and a case where the exposure time is approximately 10 msec when using a lens of f=100 mm, it is possible to produce an image less affected by camera shake by applying the technique according to the present invention without using a mechanical camera shake correction device.

Camera shake is greatly affected by brightness of a photographic subject and an exposure. An example regarding a relationship between the brightness of the photographic subject and the exposure will be explained. In a case where a sensitivity setting of an image sensor is ISO 100, when brightness of a photographic subject is 2 Lv (light value), a proper exposure satisfies Av (aperture value)+Sv (speed value)=2. If an F number of a lens is F4, Av=4, therefore Sv=−2, and a shutter speed becomes 4 seconds. Accordingly, if a shooting time duration is 1 second, the imaging controller needs to obtain image data for four times, and if a shooting time duration is 500 msec, the imaging controller needs to obtain image data for eight times.

In the above example, if image data for 10 times is obtained when the shooting time duration is 500 msec, it is necessary to delete image data for two times, and therefore image data of a time period where an amount of displacement is large is deleted, image data of a remaining time period is added. Depending on an SNR (signal-to-noise ratio) of an image sensor, there are some cases where a proper exposure is not obtained by simply adding image data, therefore a correction can be performed by decreasing or increasing the exposure time or the number of the added image data.

According to the above embodiment, a proper exposure time is displayed on the LCD 10, and thereby a user can properly select a time period used for an image production. And only a pixel signal of a time period where a displacement of an imaging apparatus is less than or equal to a threshold value set by the user beforehand is used for the image production, and thereby it is possible to produce a high quality image without bothering the user ultimately.

According to the present invention, it is possible to check a change in time of an amount of displacement of an imaging apparatus during imaging, and additionally it is possible to select only image data of an arbitrary time period by a user and produce an image. Therefore, even in a case where the imaging apparatus receives unexpected shake during shooting, only image data of the time period where the imaging apparatus receives shake can be deleted. Thus, in particular, as for the imaged image in the long exposure, it is possible to obtain a high quality image less affected by shake.

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. An imaging apparatus, comprising:
    a shooting optical system;
    an image sensor;
    an image data producer which produces image data from an image of a photographic subject formed on the image sensor via the shooting optical system;
    an imaging controller which repeatedly outputs one picture unit of image data produced in a predetermined shooting time duration by the image data producer;
    an image data recorder which records the image data outputted by the imaging controller;
    a position detector which detects a change in position of the imaging apparatus and calculates an amount of displacement of the imaging apparatus from a position at a time point of the imaging apparatus taken as a reference based on the detected change in position;
    a position recorder which records the amount of displacement calculated by the position detector and time data related to the amount of displacement;
    a display section which displays a relationship between a shooting time of each image data of the image data recorder and the amount of displacement recorded by the position recorder, during exposure or at the end of exposure; and
    an adding processor which adds arbitrary image data of the image data recorder and produces an image.

2. The imaging apparatus according to claim 1, comprising:
    a proper exposure time calculator which calculates a proper exposure time based on brightness of the photographic subject, a sensitivity setting of the image sensor, and an aperture value of the shooting optical system,
    wherein a change in time of the amount of displacement recorded by the position recorder is displayed on the display section based on the time data recorded by the position recorder in the proper exposure time calculated by the proper exposure time calculator.

3. The imaging apparatus according to claim 1, wherein the predetermined shooting time duration is arbitrarily set and changeable.

4. The imaging apparatus according to claim 1, comprising:
    a selector which selects arbitrary image data on the display section,
    wherein the image data selected by the selector is added by the adding processor and an image is produced.

5. The imaging apparatus according to claim 1, comprising:
    a judgment section which judges whether the amount of displacement detected by the position detector is larger than a predetermined threshold value or not in each time period having the predetermined shooting time duration,
    wherein the image data of a time period where the amount of displacement is judged to be smaller than the predetermined threshold value by the judgment section is added by the adding processor and an image is produced.

6. The imaging apparatus according to claim 5, comprising:
    a threshold value inputting section in which the predetermined threshold value is arbitrarily set and inputted.

7. The imaging apparatus according to claim 5, comprising a function of an automatic extension of an exposure time which calculates a total time of the time period where the amount of displacement is judged to be larger than the predetermined threshold value by the judgment section and extends the exposure time for the total time of the time period to be a proper exposure time.

8. The imaging apparatus according to claim 7, wherein it is arbitrarily selectable whether the exposure time is extended or not in the function of the automatic extension of the exposure time.

9. The imaging apparatus according to claim 1, wherein an integration value of the amount of displacement calculated by the position detector is calculated per the shooting time duration and image data in the shooting time duration where the integration value is small is preferentially outputted to the adding processor.

10. The imaging apparatus according to claim 7, wherein a total time t' of a time period where the amount of displacement is judged to be larger than the predetermined threshold value by the judgment section and a total time t of a time period where the amount of displacement is judged to be smaller than the predetermined threshold value by the judgment section are calculated, respectively, and then only image data of the time period where the amount of displacement is smaller than the threshold value is multiplied by (t'+t)/t and outputted to the adding processor.

11. The imaging apparatus according to claim 1, wherein the position recorder records a position of the imaging apparatus before starting shooting and position data before starting shooting is also displayed on the display section.

12. The imaging apparatus according to claim 1, wherein the position detector includes an acceleration sensor which detects position data in a gravity direction and a horizontal direction on a surface perpendicular to a shooting optical axis of the shooting optical system.

13. The imaging apparatus according to claim 1, wherein the position detector includes a calculator of an amount of displacement of a photographic subject which calculates an amount of displacement of a photographic subject included in image data shot per the predetermined shooting time duration from a position of the photographic subject of arbitrary image data taken as a reference per the predetermined shooting time duration, by use of position data in the horizontal direction and the gravity direction on the surface perpendicular to the shooting optical axis of the shooting optical system.

14. The imaging apparatus according to claim 13, wherein image data including the position of the photographic subject taken as the reference is arbitrarily selected.

15. The imaging apparatus according to claim 14, wherein the image data where the amount of displacement of the photographic subject in each of the gravity direction and the horizontal direction is calculated by the calculator of the amount of displacement of the photographic subject is outputted to the adding processor, after the calculated amount of displacement of the photographic subject is corrected.

16. A computer program embodied on a non-transitory computer readable medium for use in an imaging apparatus having a shooting optical system and an image sensor, and for performing:
- a step of an image data production which produces image data from an image of a photographic subject formed on the image sensor via the shooting optical system;
- a step of an imaging control which repeatedly outputs one picture unit of image data formed in a predetermined shooting time duration by the step of the image data production;
- a step of an image data recording which records the image data outputted by the step of the imaging control;
- a step of a position detection which detects a change in position of the imaging apparatus and calculates an amount of displacement of the imaging apparatus from a position at a time point of the imaging apparatus taken as a reference based on the detected change in position;
- a step of a position recording which records the amount of displacement calculated by the step of the position detection and time data related to the amount of displacement;
- a step of a display which displays a relationship between a shooting time of each image data of the step of the image data recording and the amount of displacement recorded by the step of the position recording, during exposure or at the end of exposure; and
- a step of an adding processing which adds arbitrary image data of the step of the image data recording and produces an image.

* * * * *